US012681148B2

(12) United States Patent　　(10) Patent No.: US 12,681,148 B2
Kasinec et al.　　　　　　　　　(45) Date of Patent: Jul. 14, 2026

(54) PORTABLE SENSOR SYSTEM

(71) Applicant: Evitado Technologies GmbH, Hamburg (DE)

(72) Inventors: Alexander Thomas Kasinec, Hamburg (DE); Andrew Charles Moakes, Hamburg (DE); Amos Lamar Smith, III, Hamburg (DE)

(73) Assignee: EVITADO TECHNOLOGIES GMBH, Hamburg (DE)

( * ) Notice: Subject to any disclaimer, the term of this patent is extended or adjusted under 35 U.S.C. 154(b) by 1079 days.

(21) Appl. No.: 17/774,114

(22) PCT Filed: Nov. 3, 2020

(86) PCT No.: PCT/EP2020/080839
§ 371 (c)(1),
(2) Date: May 3, 2022

(87) PCT Pub. No.: WO2021/089561
PCT Pub. Date: May 14, 2021

(65) Prior Publication Data
US 2022/0390564 A1　　Dec. 8, 2022

(30) Foreign Application Priority Data

Nov. 4, 2019　(DE) ......................... 102019129600.5

(51) Int. Cl.
*G01S 17/89*　　　(2020.01)
*G01S 7/481*　　　(2006.01)
*G01S 17/933*　　(2020.01)
(52) U.S. Cl.
CPC ........... *G01S 7/4811* (2013.01); *G01S 17/933* (2013.01)
(58) Field of Classification Search
CPC ............................... G01S 17/87; G01S 7/4811
See application file for complete search history.

(56) References Cited

U.S. PATENT DOCUMENTS

2009/0222229 A1　9/2009　Kakinami
2015/0362587 A1*　12/2015　Rogan et al.
(Continued)

FOREIGN PATENT DOCUMENTS

CN　　106628239 A *　5/2017
DE　102006007149 A1　2/2007
(Continued)

OTHER PUBLICATIONS

International Preliminary Report on Patentability and Written Opinion of the International Searching Authority for PCT/EP2020/080839; The International Bureau of WIPO, 34, chemin des Colombettes, 1211 Geneva 20, Switzerland; date of mailing May 10, 2022.
(Continued)

*Primary Examiner* — Christian Chace
*Assistant Examiner* — Shane Emanuel Douglas
(74) *Attorney, Agent, or Firm* — Thomas E. Lees, LLC

(57)　　　　　ABSTRACT

A portable sensor system is provided for detecting objects in the environment of the portable sensor system and for being temporarily attached to a mobile object. The portable sensor system includes an environment detection sensor for detecting objects, an attaching device connected to the environment detection sensor for temporarily attaching the portable sensor system to an external surface of the mobile object, and a position determining apparatus for determining a sensor position of the environment detection sensor when the environment detection sensor is attached to the external surface. The position determining apparatus is configured to determine the sensor position relative to the mobile object on the basis of a predetermined geometrical model of the external surface and a region of the external surface detected by the environment detection sensor.

23 Claims, 6 Drawing Sheets

(56) References Cited

U.S. PATENT DOCUMENTS

| 2017/0041816 A1* | 2/2017 | Cho et al. |
| 2017/0336806 A1 | 11/2017 | Blanc-Paques et al. |
| 2018/0037172 A1* | 2/2018 | Nelson et al. |
| 2019/0108763 A1 | 4/2019 | Bense et al. |
| 2019/0257949 A1* | 8/2019 | Orellana et al. |
| 2020/0142426 A1* | 5/2020 | Gist et al. |
| 2021/0100154 A1 | 4/2021 | Iwase et al. |

FOREIGN PATENT DOCUMENTS

| DE | 102017123198 A1 | 4/2019 |
| EP | 3731188 A1 | 10/2020 |
| EP | 3779512 A1 | 2/2021 |
| WO | 2016054004 A1 | 4/2016 |
| WO | 2017221228 A2 | 12/2017 |
| WO | 2018182737 A1 | 10/2018 |
| WO | 2019187937 A1 | 10/2019 |

OTHER PUBLICATIONS

International Search Report and Written Opinion of the International Searching Authority for PCT/EP2020/080839; European Patent Office, p.b. 5818, Patentlaan 2, 2280 HV Rijswijk Netherlands; date of mailing Feb. 15, 2021.

* cited by examiner

PORTABLE SENSOR SYSTEM

CROSS-REFERENCE TO RELATED APPLICATIONS

This application is a national stage entry under 35 USC § 371 of PCT International Application No. PCT/EP2020/080839, filed on Nov. 3, 2020 having the title "PORTABLE SENSOR SYSTEM", and claims the benefit of German Patent No. DE 102019129600.5, having the title "PORTABLE SENSOR SYSTEM", filed Nov. 4, 2019, which are expressly incorporated by reference herein.

BACKGROUND

Field of the Disclosure

The invention relates to a sensor system for detecting objects and to a method for detecting objects.

Description of the Related Art

It is known practice to operate a vehicle on the basis of measurement data from a surroundings detection sensor system. A surroundings detection sensor system such as this may be integrated or installed in a bodywork part of the vehicle.

SUMMARY

One aspect of the invention relates to a portable sensor system for detecting objects in the surroundings of the portable sensor system and for temporary mounting on a mobile object. The sensor system may thus be a surroundings detection system, or an object detection system. The sensor system may furthermore be a mobile sensor system, the mobile object being able to be in the form of a supporting platform for the sensor system.

The portable sensor system may be in the form of a transportable sensor system, the sensor system being able to be carried by hand and mounted on the mobile object by hand. The portable sensor system may thus be easily handled and mounted on the mobile object by an operator. The operator may be a human being or a machine, or a robot. The portable sensor system may be in a form such that it may be handled and mounted on the mobile object by a single operator.

The objects may fundamentally be any object in the surroundings of the sensor system. The objects may comprise at least one stationary object and/or at least one mobile object in the surroundings of the sensor system, or of the mobile object on which the sensor system may be mounted.

The stationary object that may be detected by the sensor system may be a stationary infrastructure object, for example a building. The mobile object on which the sensor system may be mounted or that may be detected by the sensor system may be a vehicle, for example an aircraft, or a machine. The aircraft may be an airplane. The mobile object may also be an object transported by a vehicle, for example may be a container. The mobile object may thus be a large object. The mobile object may furthermore also be a living being, for example a human being. The mobile object may furthermore also be a small object. The mobile object may therefore be a movable object that may be moving or at rest. The portable sensor system may thus be in the form of a dynamic, or mobile, sensor system.

The portable sensor system is not a permanent part of the mobile object. The portable sensor system is thus not integrated therein or permanently installed thereon. The temporary mounting on the mobile object may thus comprise transitory, nonpermanent, mounting on the mobile object. The portable sensor system may thus be in the form of a temporary add-on system. The portable sensor system may be mounted on the mobile object, the portable sensor system being situated on the mobile object transitorily. The portable sensor system may be removed from the mobile object again. The mobile object may be operated without the mounted sensor system. The mobile sensor system may provide object-based surroundings information for operation of the mobile object.

The portable sensor system comprises a surroundings detection sensor for detecting the objects. The surroundings detection sensor may comprise a distance-measuring sensor. Alternatively or additionally, the surroundings detection sensor may comprise an image-capturing sensor, for example a camera. The surroundings detection sensor may therefore also be a distance-measuring and image-capturing sensor, or a laser scanner/camera combination sensor.

The distance-measuring sensor may be in the form of a scanning sensor. The distance-measuring sensor may be for example a laser scanner (LIDAR sensor), a radar measuring device or an ultrasonic measuring device. The laser scanner may be operable on the basis of a time-of-flight method (ToF laser scanner). Alternatively or additionally, the laser scanner may be operable on the basis of a phase comparison method. The laser scanner, the radar measuring device or the ultrasonic measuring device may be in the form of a two-dimensionally or three-dimensionally scanning sensor. The laser scanner or one of the devices described may be a laser scanner that measures at high frequency, or a device that measures at high frequency, for example with a detection frequency of 10 MHz. The distance-measuring sensor may furthermore be an omnidirectionally detecting sensor, for example which measures in a 360° detection region.

If the surroundings detection sensor comprises a distance-measuring sensor, it is possible for the outer surface of the mobile object or for objects in the surroundings of the mobile object to be detected, or scanned, at particular points. The distance-measuring sensor may be used to detect a point cloud containing measurement points on the outer surface of the mobile object or on the objects in the surroundings of the mobile object. The point cloud may be a two-dimensional or three-dimensional point cloud. The point cloud may comprise two-dimensional or three-dimensional coordinates of measurement points on the outer surface of the mobile object or on the objects in the surroundings of the mobile object. The point cloud may further comprise measurement intensities relating to the measurement points, the intensities being able to define a quantitative measure of the received measurement beam energy in comparison with the transmitted measurement beam energy. As an alternative or in addition to the intensities, the point cloud may furthermore comprise image-based information, for example RGB information. For this, the surroundings detection sensor may comprise the image-capturing sensor.

The portable sensor system comprises a mounting apparatus, connected to the surroundings detection sensor, for temporarily mounting the portable sensor system on an outer surface of the mobile object. The mounting apparatus may be a mechanical mounting apparatus. The mounting apparatus may be designed for temporary mounting of the portable sensor system at any position on a mounting region of the outer surface of the mobile object. The mounting apparatus may be a non-electrically operable or an electrically operable mounting apparatus. At least regions of the mounting apparatus may be operatively connected, for example operatively connected on the basis of a vacuum, to the outer surface in order to mount the surroundings detection sensor on the outer surface. Alternatively or additionally, at least regions of the mounting apparatus may be engaged with the outer surface in order to mount the surroundings detection sensor on the outer surface. The mounting apparatus may be engaged with the outer surface using a snap-fit connection, for example. The detection of objects in the surroundings of the portable sensor system may therefore be performed in an object-supported manner, for example in a vehicle-supported, or aircraft-supported, manner.

The portable sensor system comprises a position determination device for determining a sensor attitude of the surroundings detection sensor when the surroundings detection sensor is in a state in which it is mounted on the outer surface. The sensor attitude may be determined in an object coordinate system of the mobile object. The sensor attitude may comprise at least either from a relative position and a relative orientation of the surroundings detection sensor in relation to the mobile object. The sensor attitude may also comprise at least either from a position and an orientation of the surroundings detection sensor in the object coordinate system.

The mounting apparatus may be operated by an operator. The mounting apparatus may be in an initial state, or in a state in which it is not mounted on the outer surface. The operator may put the mounting apparatus into a state in which it is mounted on the outer surface, the operator being able to arrange the mounting apparatus on the outer surface and bring about the mounted state by way of at least one from pushing the mounting apparatus onto the outer surface, latching the mounting apparatus in the outer surface, plugging the mounting apparatus into the outer surface and clamping the mounting apparatus on the outer surface. When the mounting apparatus is in the mounted state, the surroundings detection sensor may be permanently arranged on the outer surface by way of the mounting apparatus.

The position determination device is configured to determine the sensor attitude relative to the mobile object on the basis of a predetermined geometric model of the outer surface and a region of the outer surface that is detected by the surroundings detection sensor. The predetermined geometric model of the outer surface may comprise at least one geometric parameter of the outer surface. The predetermined geometric model may be based on a predefined CAD model of at least one region of the mobile object. Alternatively or additionally, the predetermined geometric model may also comprise at least one point on the outer surface, or a point cloud on the outer surface. The region of the outer surface that is detected by the surroundings detection sensor may also comprise at least one geometric parameter of the outer surface. Alternatively or additionally, the region of the outer surface that is detected by the surroundings detection sensor may also comprise at least one point on the detected region of the outer surface, or a point cloud on the detected region of the outer surface. The geometric parameter may be a surface vector, for example a normal vector, an object axis or a curvature parameter. The geometric model may be the geometric model of an outer surface, or outer contour, of an aircraft, for example.

The invention may involve the portable sensor system being transitorily mounted on a mobile object in order to serve as a surroundings detection system during operation of the mobile object. After the sensor system has been mounted on the object, position determination for surroundings detection may then take place only on the basis of the geometry of the mobile object and relative thereto.

The portable sensor system may be operable in an indoor environment and/or in an outdoor environment. The portable sensor system may thus also be an indoor and/or outdoor sensor system. This is also facilitated by virtue of the portable sensor system being operable independently of a satellite positioning method, for example based on GNSS or GPS.

According to one embodiment, the mobile object is a means for transporting people or goods. The means for transporting people or goods may be a vehicle or a machine. The means for transporting people or goods, or the vehicle, may be an aircraft. In another example, the means for transporting people or goods may be a vehicle for freight transport, or heavy transport. The means for transporting people or goods may also comprise a transport apparatus for transporting people or goods, the transport apparatus being able to be movable by the vehicle or the machine. The transport apparatus may be a container, for example. The means for transporting people or goods may furthermore comprise at least one transported person and/or a transported good, the person or the good being able to be movable by the vehicle or the machine. The transported good may be a vehicle, for example.

According to the preceding embodiment, the mounting apparatus may be designed for temporary mounting of the portable sensor system on an outer surface of the means for transporting people or goods. If the means for transporting people or goods is an aircraft, the mounting apparatus may be designed for temporary mounting of the portable sensor system on a fuselage region of the aircraft. The outer surface itself may be in a form without mounting aids, that is to say without means for mounting the portable sensor system on the outer surface. The outer surface may be a planar or curved surface that may be in a form without recesses or depressions.

According to a further embodiment, the surroundings detection sensor comprises a laser scanner for extensively detecting objects in the surroundings of the portable sensor system. The laser scanner may scan the objects contactlessly. The laser scanner may comprise a three-dimensional detection region, the detection region being able to extend annularly, or toroidally, from the laser scanner into the surrounds thereof. The detection region may widen into the surroundings in this case. The portable sensor system, or the surroundings detection sensor, may comprise a (3D) laser scanner, or may be in the form of such. The two laser scanners may each comprise the three-dimensional detection region described. The use of a laser scanner having a three-dimensional beam deflection has the advantage that the laser scanner itself does not need to be moved for the purpose of three-dimensional surroundings detection. A housing of the laser scanner, or a respective housing of the two laser scanners, may thus be connected to the mounting apparatus rigidly or in an articulated manner. This allows the portable sensor system to be in more compact and lower-maintenance form. Another advantage of this embodiment is that objects may be detected independently of current lighting and weather.

According to a further embodiment, the portable sensor system comprises at least one further surroundings detection sensor for detecting the objects. The further surroundings detection sensor may be in the same form as the described surroundings detection sensor, the further surroundings detection sensor also being able to comprise a laser scanner, for example. The further surroundings detection sensor may serve at least one of the purposes described in connection with the described surroundings detection sensor, the further surroundings detection sensor being able to comprise the same detection features as the described surroundings detection sensor. The further surroundings detection sensor may furthermore be of the same design as the described surroundings detection sensor. The surroundings detection sensors may advantageously comprise a combined detection region, which may be larger than the individual detection regions of the surroundings detection sensors.

The mounting apparatus may also be connected to the further surroundings detection sensor for the purpose of temporarily mounting the portable sensor system on the outer surface of the mobile object. The position determination device may be configured to determine a sensor attitude of the further surroundings detection sensor when the further surroundings detection sensor is in a state in which it is mounted on the outer surface, the sensor attitude of the further surroundings detection sensor being able to be determined like the sensor attitude of the described surroundings detection sensor. The position determination device may moreover be configured to determine the sensor attitude of the further surroundings detection sensor relative to the mobile object on the basis of the predetermined geometric model of the outer surface and a region of the outer surface that is detected by the further surroundings detection sensor.

If the portable sensor system comprises the further surroundings detection sensor, the respective measurement data, or point clouds, may be acquired in each case, these being able to be taken as a basis for determining the respective sensor attitude of the respective surroundings detection sensor as described. Alternatively, the respective measurement data, or point clouds, may initially be fusioned. For this, the relative attitude of the surroundings detection sensors in relation to one another may be predetermined. The fusioned measurement data, or point clouds, may then jointly form the detected region of the outer surface. Fusioning of the measurement data, or the point clouds, may also be based on a geometric correlation of the measurement data, or point clouds. A point cloud may thus also be a fusioned point cloud from at least two laser scanners.

According to a further embodiment, the mounting apparatus is designed for toolless mounting of the portable sensor system on the outer surface of the mobile object. Toolless mounting comprises mounting of the portable sensor system on the outer surface without the use of tools. The mounting apparatus may furthermore be designed for adapterless mounting of the portable sensor system on the outer surface of the mobile object. An operator may thus mount the portable sensor system on the outer surface of the mobile object in a particularly efficient manner directly and without the use of tools or an adapter.

According to a further embodiment, the mounting apparatus comprises at least one handle for manual mounting of the portable sensor system on the outer surface of the mobile object. The handle may be permanently connected to, or mounted on, the mounting apparatus, or the portable sensor system. Alternatively, the handle may be temporarily mountable on the mounting apparatus, or on the portable sensor system, for manual mounting, and removable again. The handle allows the portable sensor system to be handled by an operator advantageously ergonomically and intuitively during mounting.

The mounting apparatus may comprise a device for pressure-based mounting of the portable sensor system on the outer surface of the mobile object. The pressure-based mounting may be vacuum-based, underpressure-based or overpressure-based mounting. According to a further embodiment, the mounting apparatus comprises at least one suction cup for suction-force-based mounting of the portable sensor system on the outer surface of the mobile object. The suction cup may be in contact with the outer surface and may be pushed against the latter. The mounting apparatus may thus be designed for pressure-based, or suction-force-based, retention of the portable sensor system on the outer surface of the mobile sensor system. The portable sensor system may thus be mounted on the outer surface particularly efficiently and advantageously in a toolless and resitueless manner. It is thus possible to dispense with the use of an adhesive, or bonding agent, when mounting the portable sensor system, which allows efficiency and acceptance when using the portable sensor system to be increased further.

The surroundings detection sensor may be rigidly connected to the mounting apparatus. The surroundings detection sensor may be connected to the mounting apparatus by way of a rigid frame on which the surroundings detection sensor and the mounting apparatus are mounted. If the portable sensor system comprises the further surroundings detection sensor, the surroundings detection sensors may be permanently connected to one another by way of the frame. The frame may be a lightweight frame, which allows the portability of the sensor system to be ensured. Furthermore, rigid connection of the surroundings detection sensor to the mounting apparatus allows the portable sensor system to be more robust in the face of interfering influences that may influence the relative attitude of the surroundings detection sensor in relation to the mounting apparatus, or in relation to the mobile object on which the surroundings detection sensor may thus be rigidly mounted. Surroundings detection may thus advantageously be performed more precisely.

The surroundings detection sensor may be connected to the mounting apparatus in an articulated manner. The surroundings detection sensor may be articulated to the mounting apparatus by at least one articulation. If the portable sensor system comprises the further surroundings detection sensor, at least one of the surroundings detection sensors may be rigidly connected to the mounting apparatus and/or at least one of the surroundings detection sensors may be connected to the mounting apparatus in an articulated manner. At least one of the described surroundings detection sensors may be arranged on the mounting apparatus so as to be pivotable or rotatable. A surroundings detection sensor such as this may furthermore be lockable or may be arranged so as to be pivotable or rotatable in such a way that it may be pivoted or may rotate during detection of the surroundings. The detection region of the surroundings detection sensor or of the surroundings detection sensors may thus be optimized further.

According to a further embodiment, the position determination device is configured to determine the sensor attitude in an object coordinate system that is referenced to the mobile object. The sensor attitude may comprise at least one from a sensor position and a sensor orientation of the surroundings detection sensor in the object coordinate system. The sensor attitude may thus comprise at least one from a relative position and a relative orientation of the surroundings detection sensor referenced to the mobile object. One of the described orientations may be, or comprise, an applicable alignment. The object coordinate system may furthermore be an applicable coordinate system of a means for transporting people or goods, for example may be a vehicle coordinate system, for example of an aircraft. The object coordinate system may also be a model coordinate system of the outer surface.

According to a further embodiment, the position determination device is configured to determine the sensor attitude on the basis of a geometric correlation between the detected region of the outer surface and the predetermined geometric model of the outer surface. The position determination may be configured to determine the sensor attitude on the basis of an ICP algorithm relating to the geometric correlation between the detected region of the outer surface and the predetermined geometric model of the outer surface. The geometric correlation may comprise geometric matching of the detected region of the outer surface to the predetermined geometric model of the outer surface. The correlation, or the matching, may be applicable point-based and/or feature-based matching.

The point-based matching may be based on at least one point cloud. The point-based matching may be based on a point cloud detected by the surroundings detection sensor on the outer surface of the geometric model, which may be a sensor point cloud. As an alternative or in addition to the detected point cloud, the point-based matching may be based on a point cloud that is derived from the geometric model of the outer surface, which may be a reference point cloud, or a model point cloud. The point-based matching may therefore be based on a correlation, or a comparison, of the point cloud detected by the surroundings detection sensor and the point cloud derived from the geometric model of the outer surface. The point-cloud-based matching may be performed on the basis of an ICP algorithm, the two point clouds taken into consideration for a correlation, or for a point cloud comparison, being able to form input variables for the ICP algorithm. Transformation parameters from a sensor coordinate system to an object coordinate system, or to a model coordinate system, may further be output variables of the ICP algorithm.

The feature-based matching may be based on at least one geometric feature derived from at least one of the described point clouds. As an alternative or in addition to the point-based correlation, the feature-based matching may also comprise a feature-based correlation. The geometric feature may be derived on the basis of a best-fit method, for example, a multiplicity of points in the point cloud being able to be defined by a geometrically adapted geometric body, surface and/or axis. By way of example, the body, the surface and/or the axis may be based on a body, surface and/or axis that is adapted to suit the multiplicity of points in the point cloud by means of adjustment calculation (least squares method). The feature-based correlation may thus be based for example on a correlation of applicable bodies, surfaces and/or axes that are derivable from at least one of the described point clouds.

The geometric correlation may comprise comparison, or overlaying, of the detected region of the outer surface with the predetermined geometric model of the outer surface. The position determination device may therefore advantageously be configured to determine the sensor attitude locally, or in a model-based manner, even if the mobile object with the surroundings detection sensor mounted thereon moves in a global coordinate system.

The position determination device may be configured to determine the sensor attitude on the basis of a transformation between the detected region of the outer surface and the predetermined geometric model of the outer surface. The transformation may be a geometric transformation, or a coordinate transformation. The position determination device may be configured to determine transformation parameters for the transformation between the detected region of the outer surface and the predetermined geometric model of the outer surface. The transformation parameters may comprise at least one from at least one translation parameter, at least one rotation parameter and at least one scale factor. The transformation parameters may be transformation parameters of a 6-parameter transformation, for example, the transformation parameters being able to comprise three translation parameters and three rotation parameters. The position determination device may be configured to determine the transformation parameters for a Cartesian sensor coordinate system and a Cartesian model coordinate system of the geometric model. The position determination device may therefore advantageously be configured to determine the sensor attitude on the basis of a local sensor coordinate system and a local model coordinate system independently of a global coordinate system.

If the portable sensor system comprises multiple surroundings detection sensors, or laser scanners, the position determination device may be configured to determine the individual sensor attitudes of the surroundings detection sensors, or laser scanners, on the basis of a respective transformation between the regions of the outer surface that are detected by the respective surroundings detection sensor, or laser scanner, and the predetermined geometric model of the outer surface. If a fusioned point cloud from multiple laser scanners is available, a shared sensor attitude of the surroundings detection sensors may also be determined. The measurement data, or point clouds, from the surroundings detection sensors, or laser scanners, may thus be each or jointly transformed to the object coordinate system, or model coordinate system.

If the portable sensor system comprises multiple surroundings detection sensors, or laser scanners, the position determination device may also be configured to determine the relative attitude between the surroundings detection sensors, or laser scanners. The position determination device may thus also be configured to correlate measurement data, or a point cloud, from one of the two surroundings detection sensors, or laser scanners, with the other measurement data, or the other point cloud, from the other of the two surroundings detection sensors before accordingly correlated measurement data, or point clouds, may be jointly transformed to the object coordinate system, or model coordinate system.

The portable sensor system may be autonomous. The portable sensor system may in particular be energy-autonomous, the portable sensor system being able to comprise an autonomous power supply, for example a storage battery, or a battery. The power supply may be arranged in the frame. The portable sensor system may therefore also be a battery-operated sensor system. According to a further embodiment, the position determination device is configured to determine the sensor attitude autonomously. The position determination device may determine the sensor attitude independently of further detection sensors. The position of the surroundings detection sensor does not need to be detected by a position detection sensor, the mobile object in particular not needing to be tracked by such a sensor. The orientation of the surroundings detection sensor also does not need to be detected by an orientation detection sensor. The position determination device may therefore be configured to determine the sensor attitude only on the basis of the measurement data from the surroundings detection sensor.

According to a further embodiment, the position determination device is part of a computing and control device for evaluating measurement data from the surroundings detection sensor and for actuating the surroundings detection sensor. The position determination device, or the computing and control device, may be configured to calculate the described transformation parameters. The computing and control device may be connected to the surroundings detection sensor by wire or wirelessly, or on a radio basis. The computing and control device may be arranged on the described frame of the portable sensor system. The portable sensor system may thus advantageously form a compact sensor system having an integrated computing and control device. The portable sensor system may therefore be a stand-alone system.

According to a further embodiment, the portable sensor system comprises a mobile terminal that comprises the position determination device. The mobile terminal may comprise a processor, the mobile terminal being able to be a tablet PC, for example. The mobile terminal may comprise the described computing and control device. Parts of the computing and control device may also be arranged on the portable sensor system and on the mobile terminal in a distributed manner.

According to a further embodiment, the portable sensor system comprises a mobile terminal that is configured to wirelessly communicate with the surroundings detection sensor in order to control the surroundings detection sensor remotely. The mobile terminal may comprise a GUI display for applicable interoperability with an operator. The mobile terminal may be the mobile terminal described in relation to the preceding embodiment. The portable sensor system, or the computing and control device, may comprise a control device to control the surroundings detection sensor. The mobile terminal may comprise the control device to control the surroundings detection sensor remotely. The portable sensor system may therefore comprise a remote control that may be used to actuate the surroundings detection sensor at a distance therefrom and wirelessly. The remote controlling may also comprise remote monitoring according to the monitoring described.

According to a further embodiment, the mobile terminal is configured to display objects detected in the surroundings of the portable sensor system by the portable sensor system. The mobile terminal may be one of the mobile terminals described in relation to the preceding embodiments. The mobile terminal may be configured to disc play raw data, or measurement data, from the surroundings detection sensor. The computing and control device, or the mobile terminal, may be configured to process the measurement data captured by the surroundings detection sensor further. Measurement data that are processed further may be preprocessed measurement data, filtered measurement data, abstracted measurement data and/or classified measure-data. Applicable abstraction of the measurement data, or applicable classification of the measurement data, may relate to the detected objects.

The mobile terminal may be configured to display the geometric model of the outer surface of the mobile object. The mobile terminal may therefore be configured to display the objects detected in the surroundings of the portable sensor system by the portable sensor system, and the geometric model. The mobile terminal may thus also be configured to display the detected objects relative to the geometric model. The mobile terminal may be configured to display the detected objects in the described object coordinate system, or model coordinate system. An operator may therefore advantageously compare the relative attitude of detected objects in relation to the mobile object in proximate real time when operating the mobile terminal.

According to a further embodiment, the portable sensor system comprises a collision monitoring device for monitoring objects situated in the surroundings of the portable sensor system. The monitoring may be based on voxel mapping for collision monitoring. The objects situated in the surroundings of the portable sensor system may be moving objects or objects at rest. The monitoring may comprise detecting, locating and/or identifying the objects situated in the surroundings of the portable sensor system. The monitoring may furthermore comprise blind spot monitoring in a predetermined monitoring region. The predetermined monitoring region may comprise a subregion of the monitoring region or at least one subregion of a measurement region of the surroundings detection sensor. The collision monitoring unit may be part of the computing and control device. The collision monitoring device may be configured to identify whether an object monitored in the surroundings is a potential collision object. The potential collision object may be a static or dynamic object, or an object at rest or a moving object. A potential collision object may be another mobile object or a building, for example.

The monitored object may be a detected object. The collision monitoring device may be configured to classify detected, or monitored, objects into potential collision objects and non-potential collision objects. The collision monitoring device may be configured to take a distance between the mobile object and the detected, or monitored, object as a basis for identifying or classifying the latter accordingly. As an alternative or in addition to the distance, a detected geometry or direction of movement of the detected, or monitored, object may also be used for this. An object approaching the mobile object may thus be classified as a potential collision object, for example. The objects situated in the surroundings of the portable sensor system may be tracked by the surroundings detection sensor for this purpose. Furthermore, the collision monitoring device may be configured to take a threshold value, for example a distance-dependent threshold value relating to the distance between the mobile object and a detected, or monitored, object, as a basis for identifying or classifying this object accordingly. The portable sensor system may thus advantageously serve as a portable and sensor-based collision monitoring system, or collision avoidance system.

The portable sensor system may comprise a maneuvering device, or parking device, for maneuvering, or parking, the mobile object. The maneuvering device, or parking device, may be connected to the collision monitoring device and may have a maneuvering instruction or a parking instruction ready on the basis of objects that are situated in the surroundings of the portable sensor system and monitored. The maneuvering instruction or the parking instruction may be an instruction to move the mobile object, allowance for which allows a collision with the detected, or monitored, objects to be avoided. The instruction may be displayed on the mobile device. Alternatively, the instruction may also be displayed on a control device for controlling the movement of the mobile object or may be transmitted from the control device to a device for moving the mobile object in order to control a movement of the mobile object. The portable sensor system may thus also serve as a parking system for parking the mobile object or as a maneuvering system for maneuvering the mobile object.

According to a further embodiment, the position determination device comprises a data interface to a logistics information system for the purpose of providing objects detected, tracked or monitored by the portable sensor system for the logistics information system. Attitude information, positions and/or tracked trajectories of objects monitored, or tracked, by the portable sensor system may be provided to the logistics information system via the data interface. Such information relating to the detected or monitored objects may thus be provided to the logistics information system more or less in real time. The data interface may also be configured to provide metadata relating to the detected or monitored objects. The metadata may comprise at least one from the distance described in relation to collision monitoring, the detected geometry and the direction of movement.

The logistics information system may be configured to detect or determine the curls rent attitude of the mobile object in a logistics system coordinate system. On the basis of this, the logistics information system may be configured to transform the detected, tracked or monitored objects, or the position or attitude thereof, from the object coordinate system to the logistics coordinate system. As such, the objects detected locally and relative to the mobile object may be transformed to a superordinate system, for example the logistics system coordinate system.

Another aspect of the invention relates to a method for detecting objects in the surroundings of a mobile object. The preceding aspect and the embodiments described in relation thereto may be applied mutatis mutandis to the method, the method steps thereof and the subjects for performing the method that were cited for said method, and vice versa.

As one step, the method comprises temporarily mounting at least one surroundings detection sensor on an outer surface of the mobile object. The temporary mounting may be performed manually by an operator. Alternatively, the mounting may also be performed in an at least semiautomated manner, for example by a robot. During the mounting, the mobile object may be at rest, for example in a parked position, a maintenance position or in a storage position. The temporary mounting may be flexible mounting in a mounting region on the outer surface of the mobile object.

As a further step, the method comprises detecting a region of the outer surface by way of the surroundings detection sensor mounted on the outer surface. The detection may be controlled (remotely) by the operator, this being able to be carried out using the mobile terminal, for example. Alternatively, the detection may be performed in an at least semiautomated manner. The mobile object may be at rest or in motion during the detection.

As a further step, the method comprises determining a sensor attitude of the surroundings detection sensor relative to the mobile object on the basis of a predetermined geometric model of the outer surface and the region of the outer surface that is detected by the surroundings detection sensor system. The determination may be performed by the position determination device described in relation to the preceding aspect. The determination, or the position determination device, may be controlled (remotely) by the operator, this being able to be carried out using the mobile terminal, for example. Alternatively, the determination may be performed in an at least semiautomated manner. The mobile object may be at rest or in motion during the determination.

As a further step, the method comprises detecting objects in the surroundings of the mobile object by way of the surroundings detection sensor relative to the mobile object. The detection, or the surroundings detection sensor, may be controlled (remotely) by the operator, this being able to be carried out using the mobile terminal, for example. Alternatively, the detection may be performed in an at least semiautomated manner. The mobile object may be at rest or in motion during the detection.

According to one embodiment, as a further step, the method comprises displaying the objects detected in the surroundings of the portable sensor system by the portable sensor system on a mobile terminal. The displaying may be display in (proximate) real time. As a further step, the method may therefore comprise monitoring the objects detected in the surroundings of the portable sensor system by the portable sensor system. The monitoring may be carried out by an operator. Alternatively, the monitoring may be performed in an at least semiautomated manner. The mobile object may be at rest or in motion during the displaying or monitoring.

According to a further embodiment, the method may also be performed to monitor the surroundings for potential collision objects that may potentially collide with the mobile object. The monitoring of the surroundings may comprise the monitoring des scribed in relation to the preceding embodiment. The monitoring may be performed by the collision monitoring device described in relation to the preceding aspect.

As a further step, the method may comprise identifying whether an object detected in the surroundings is a potential collision object. The identification may also be performed by the collision monitoring device described in relation to the preceding aspect. The identification may comprise calculating a risk of collision on the basis of the object identified as potential collision object. The calculation of the risk of collision may be based on a relative change of attitude between the mobile object and the object identified as a potential collision object. The risk of collision may be calculated on the basis of a current distance between the mobile object and the object identified as a potential collision object, for example. A change of distance may also be used as a basis for this.

As a further step, the method may comprise displaying the potential collision object on a mobile terminal. The displaying may be performed as described in relation to the preceding aspect.

According to a further embodiment of the method, the step of detecting comprises filtering of objects in the surroundings of the mobile object that are detected by the surroundings detection sensor. The filtering may be performed on the basis of two-dimensional or three-dimensional mapping. The filtering may furthermore be performed in a voxel-based manner, the mapping being able to be voxel mapping. The voxel mapping may be performed by the surroundings detection sensor, or the laser scanner, already in order to preprocess the measurement data, or point clouds, said surroundings detection sensor or laser scanner being able to comprise a measurement data preprocessing device for this purpose. The filtering may comprise filtering of the measurement data, or of the raw data, from the surroundings detection sensor using an appropriate filter. The filter may be a data reduction filter. The filtering may furthermore be point-cloud-based or display-based filtering. A calculation time, or a data communication, may thus advantageously be more efficient.

According to a further embodiment of the method, the mobile object is a means for transporting people or goods. The means for transporting people or goods may be an aircraft. The means for transporting people or goods may also be any means described in relation to the preceding aspect.

The step of temporary mounting comprises temporary mounting of the surroundings detection sensor on an outer surface of the means for transporting people or goods. If the means for transporting people or goods is an aircraft, the temporary mounting of the surroundings detection sensor may comprise temporary mounting on a fuselage region of the aircraft.

At least the step of detecting objects may be performed during movement of the means for transporting people or goods over the ground. If the means for transporting people or goods is an aircraft, at least the step of detecting objects may be performed during rolling or reversing, or towing, of the aircraft on the ground. The ground may be a runway of an airport. The rolling may be taxiing of the aircraft. The reversing may be pushback of the aircraft. The method may thus be performed during rolling, or a taxiing process, or during reversing, or a pushback process. If the method is employed during rolling, it may serve as a rolling traffic system for monitoring collisions in the rolling traffic, for example.

The method may be performed in an indoor environment and/or in an outdoor environment. The method may also be performed during movement of the mobile object in a building, for example a production shed or a hanger. If the method is employed during such movement, it may serve as a production safety system or as a parking system for monitoring collisions in the production shed or the hanger, for example.

BRIEF DESCRIPTION OF THE DRAWINGS

FIG. 3 shows a portable sensor system according to a further embodiment of the invention.

DETAILED DESCRIPTION

Figure 1:
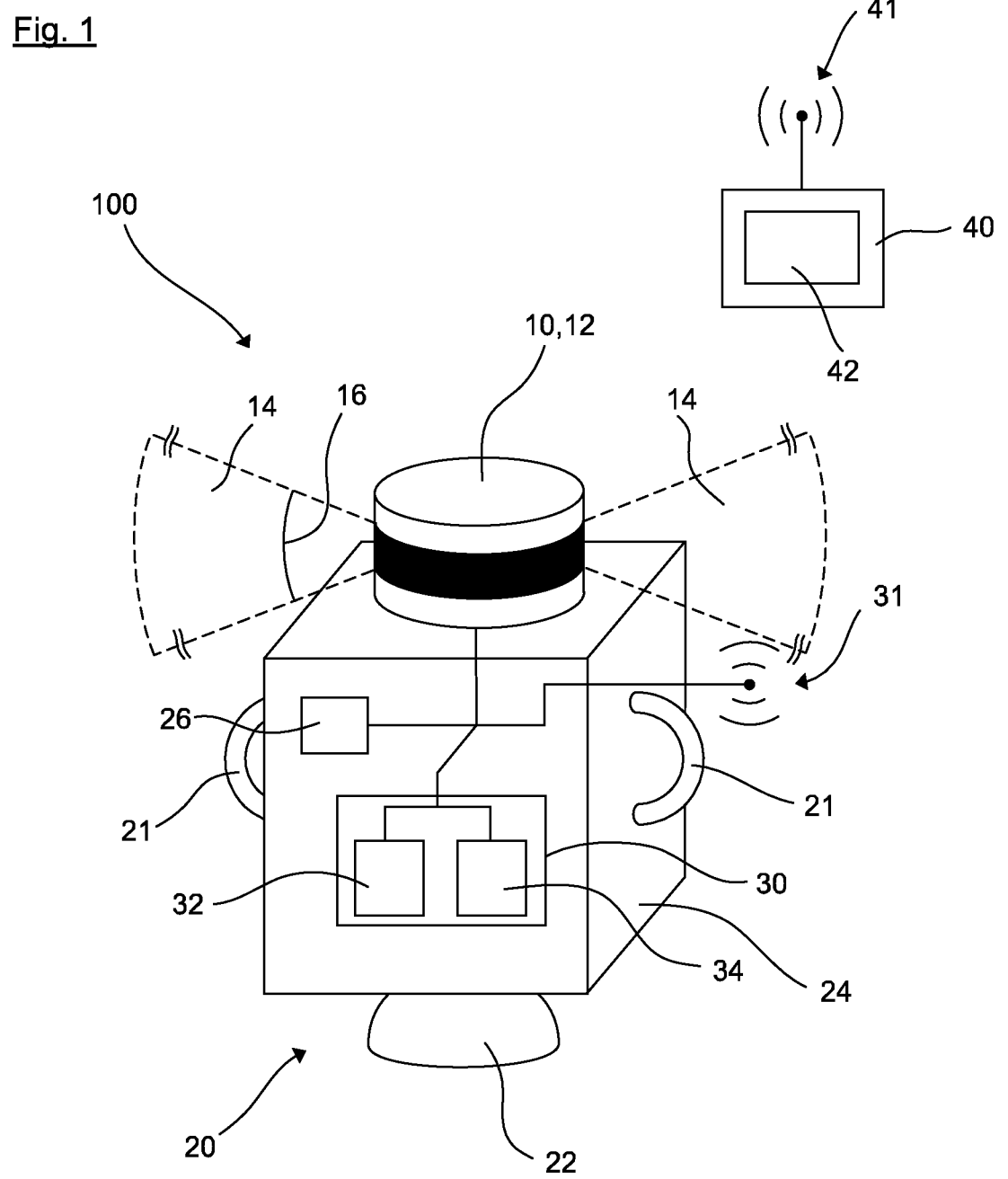
FIG. 1 shows a portable sensor system according to an embodiment of the invention.

The portable sensor system 100 shown in FIG. 1 comprises a surroundings detection sensor 10 and a mounting apparatus 20 for mounting the portable sensor system 100 on a mobile object, which is not shown in FIG. 1. The mounting apparatus 20 may be used to temporarily mount the surroundings detection sensor 10 on the mobile object. The portable sensor system 100 comprises a computing and control device 30. The portable sensor system 100 may moreover comprise a mobile terminal 40. The mobile terminal 40 may communicate with the surroundings detection sensor 10 and the computing and control device 30 wirelessly, or on a radio basis.

The surroundings detection sensor 10 and the mounting apparatus 20 may be arranged on a housing 24 in which the computing and control device 30 may be housed. Instead of the housing 24, the portable sensor system 100 may also comprise a frame (not shown) on or in which the surroundings detection sensor 10, the mounting apparatus 20 and the computing and control device 30 may be arranged. The housing 24 or the frame may have at least one handle 21 mounted on it by way of which the portable sensor system 100 may be carried manually by an operator. The portable sensor system 100 is designed and dimensioned in such a way that the operator may carry the portable sensor system 100 manually.

The surroundings detection sensor 10 may be arranged opposite the mounting apparatus 20, on opposite sides of the housing 24 or of the frame. The surroundings detection sensor 10 may be in the form of a 3D laser scanner 12. The 3D laser scanner 12 may comprise a detection region 14, which is shown schematically in FIG. 1. The detection region 14 may comprise a beam angle 16 that may define a spread of the detection region 14, which extends annularly, or toroidally, around the laser scanner 12. Within the beam angle 16, the detection region 14 may extend 360° around the laser scanner 12 in one dimension, for example at the sides.

The computing and control device 30 comprises a position determination device 32 and a collision monitoring device 34. The computing and control device 30, the position determination device 32 and the collision monitoring device 34 are connected to the surroundings detection sensor 10. An applicable connection may be a wired connection in the housing 24, or in the frame. The position determination device 32 comprises a predetermined geometric model of an outer surface of the mobile object. The position determination device 32 moreover reads in a region of the outer surface that is detected by the surroundings detection sensor 10. A sensor attitude 11, not shown in FIG. 1, of the surroundings detection sensor 10 relative to the mobile object is determined by the position determination device 32 and transmitted to the collision monitoring device 34. The collision monitoring device 34 may take the predetermined geometric model of the outer surface and further objects detected by the surroundings detection sensor 10 in the surroundings of the mobile object as a basis for checking whether a collision between the mobile object and one of the detected further objects is impending.

The computing and control device 30 is connected to an antenna 31 in order to transmit a relative attitude of the monitored objects in the surroundings of the mobile object, referenced to the mobile object itself, to the mobile terminal 40. The mobile terminal 40 comprises a terminal antenna 41 for this purpose, in order to receive corresponding data. The mobile terminal 42 moreover comprises a display 42 that may be used to visually display potential collision objects to an operator. Based on the displayed potential collision objects, the operator may intervene in the operation of the mobile object or in the operation of the potential collision objects. This may be taken as a basis for avoiding an impending collision.

The mounting apparatus 20 may comprise at least one suction cup 22, in which the portable sensor system 100, or the surroundings detection sensor 10, may be mounted on the outer surface of the mobile object. The mounting may be effected in a toolless and residue-free manner.

The portable sensor system 100 may moreover comprise a power supply 26, which may comprise a battery, or a storage battery. The portable sensor system 100 may thus be in the form of an energy-autonomous system. The portable sensor system 100 may moreover be controlled remotely using the mobile terminal 40 via a radio connection between the terminal antenna 41 and the antenna 31. This may involve in particular the detection of objects in the surroundings of the portable sensor system 100 by the surroundings detection sensor 10, the position determination by the position determination device 32 and the collision monitoring by the collision monitoring device 34 being controlled.

Figure 2:
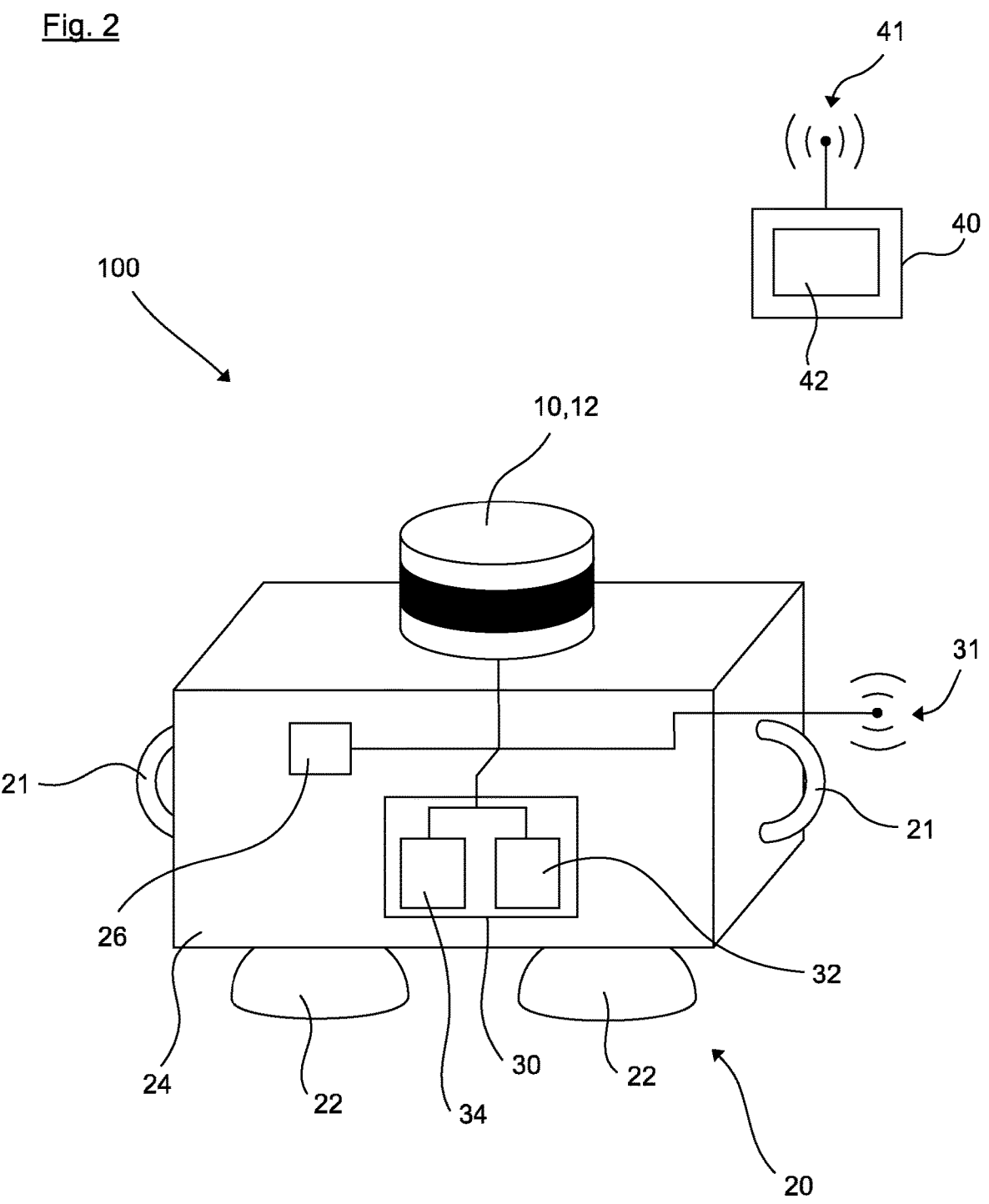
FIG. 2 shows a portable sensor system according to a further embodiment of the invention.

FIG. 2 shows a portable sensor system 100 in a further embodiment. The portable sensor system 100 shown in FIG. 2 differs from the portable sensor system 100 shown in FIG. 1 in that the mounting apparatus 20 comprises at least two suction cups 22. The two suction cups 22 may be arranged on one side of the housing 24, or of the frame, which may form an elongate side. The housing 24, or the frame, may thus comprise a square shape as shown in FIG. 1 or a rectangular shape as shown in FIG. 2.

Figure 3:
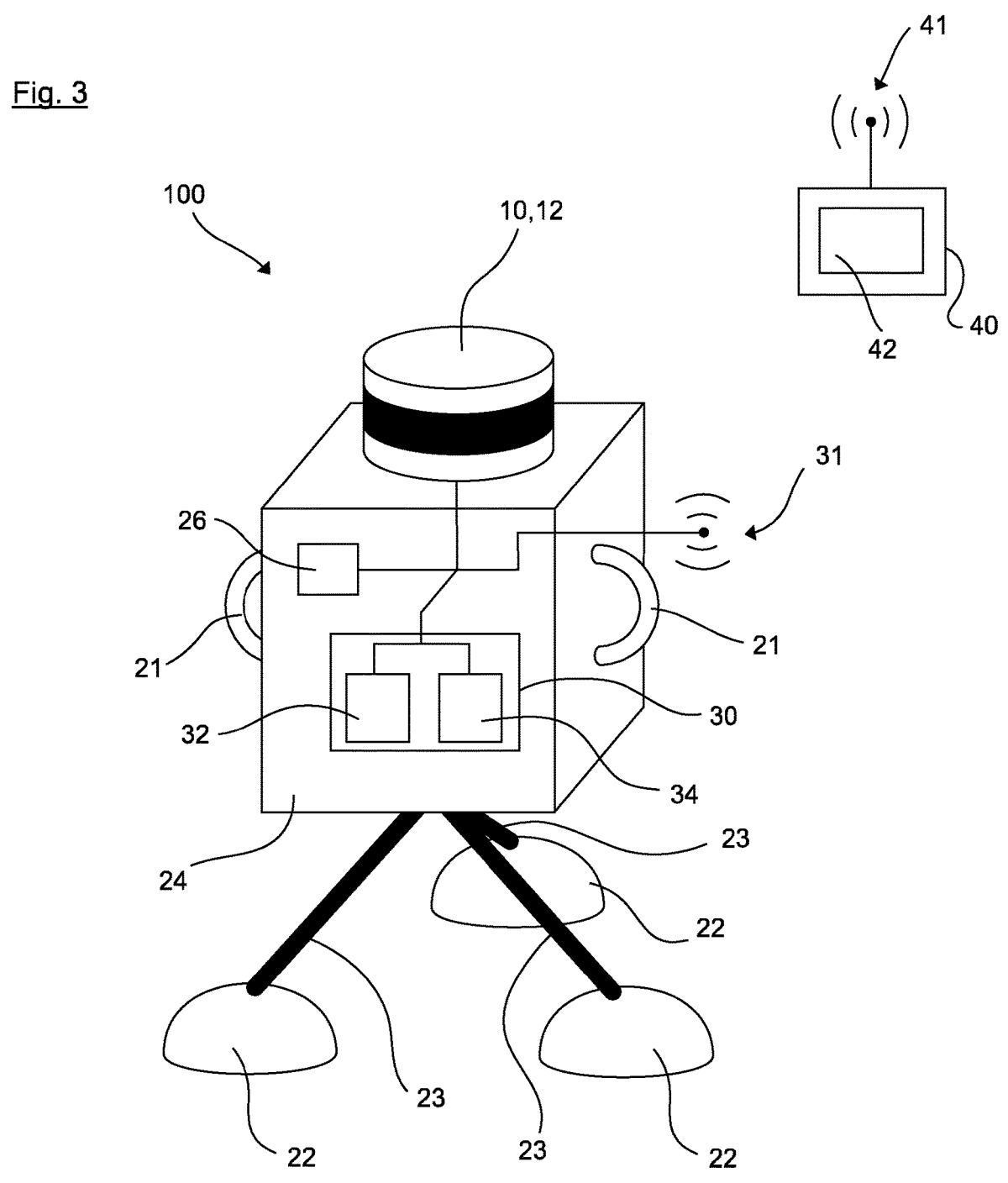

FIG. 3 shows a further embodiment of the portable sensor system 100, which differs from the embodiments shown in FIGS. 1 and 2 in that there is provision for at least three suction cups 22 for mounting the portable sensor system 100 on the mobile object. The three suction cups 22 may be arranged on the housing 24, or on the frame, as shown in FIGS. 1 and 2. Each of the suction cups 22 shown in FIGS. 1 to 3 may, as shown in FIG. 3, be mounted on the housing 24, or on the frame, by way of at least one suction cup leg 23. As shown in FIG. 3, three suction cups 22 may be mounted by way of a tripod comprising three suction cup legs 23. Mounting of the portable sensor system 100 on the outer surface of the mobile object may thus be provided more robustly and more independently of interfering influences, for example weather influences such as wind, on the outer surface of the mobile object.

Figure 4:
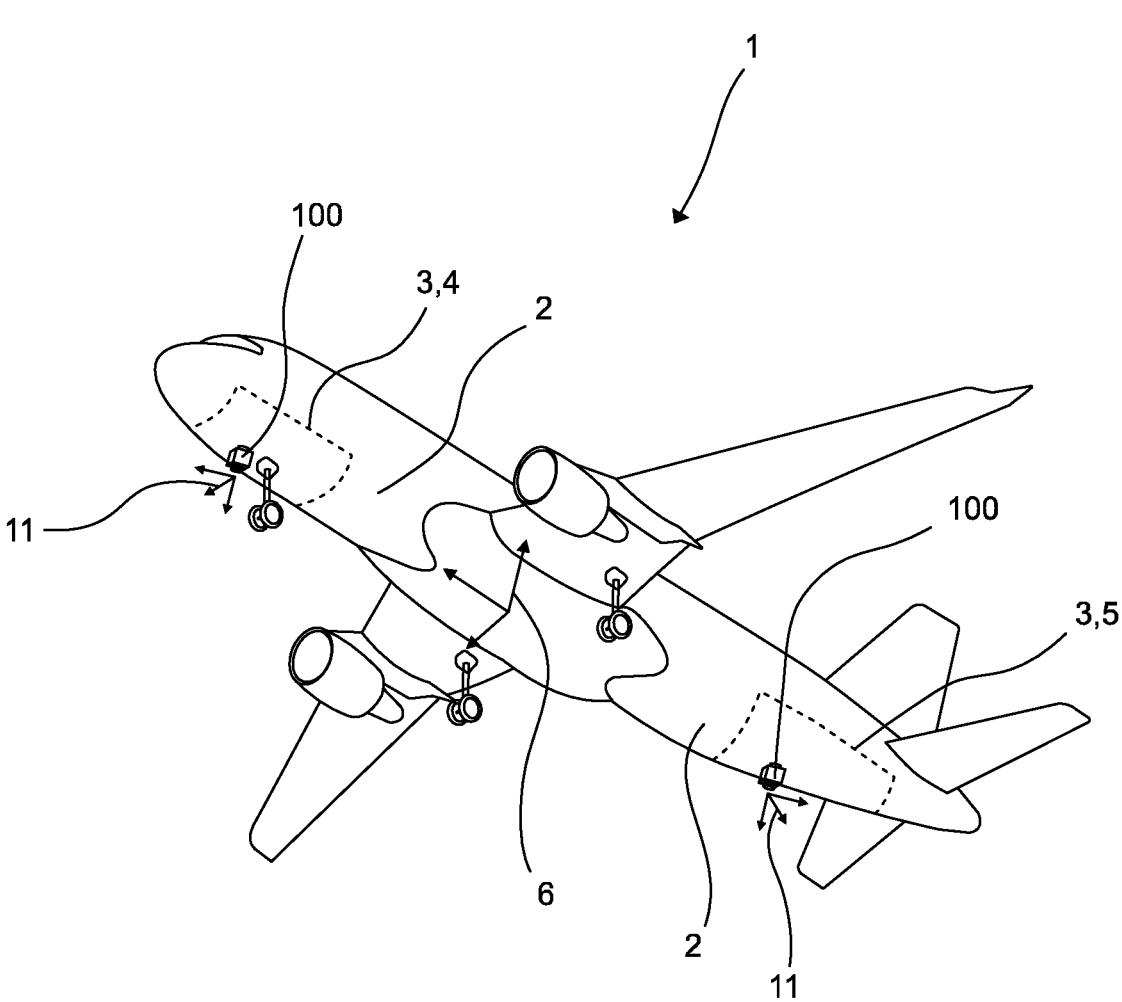
FIG. 4 shows an aircraft having two portable sensor systems mounted on an airplane fuselage of the aircraft.

FIG. 3 4 shows a mobile object in the form of an aircraft 1. The aircraft 1 comprises a fuselage region 2 on which at least one portable sensor system 100 is mounted. In the embodiment shown in FIG. 4, two portable sensor systems 100, each of which may comprise a 3D laser scanner 12, are mounted. Each of the portable sensor systems 100 may be one of the portable sensor systems 100 described in relation to FIGS. 1 to 3.

The fuselage region 2 of the aircraft 1 may comprise two mounting regions 3. The two mounting regions 3 may include a forward mounting region 4 and an aft mounting region 5. The forward mounting region 4 may include a bow region, or a nose region, in the fuselage region 2 of the aircraft 1. The portable sensor system 100 may be mounted at any position on the outer surface of the forward mounting region 4 in principle. The portable sensor system 100 may be mounted in front of a nose wheel of the aircraft 1, for example. The aft mounting region 5 may include a rear region, or a tail region, of the fuselage region 2. The further portable sensor system 100 may be mounted on the outer surface of the aft mounting region 5 at any location in principle. The fundamentally arbitrary mountability of the portable sensor systems 100 may be based on respective mounting of the portable sensor system 100 using at least one suction cup 22.

The geometric model of the outer surface of the aircraft 1, or of the fuselage region 2, may be predetermined in an aircraft coordinate system 6. The portable sensor systems 100 may detect the outer surface of the fuselage region 2 in their respective detection region 14. A respective sensor attitude 11 of the two portable sensor systems 100, which is shown schematically by a respective tripod in FIG. 4, may be determined on the basis of a geometric correlation of the geometric model with the detected regions by the position determination device 32 of the portable sensor systems 100 that is shown in FIGS. 1 to 3. The geometric model, or the detected regions, may moreover include lower regions of at least one wing, of at least one engine or of at least one rudder of the aircraft 1.

Figure 5:
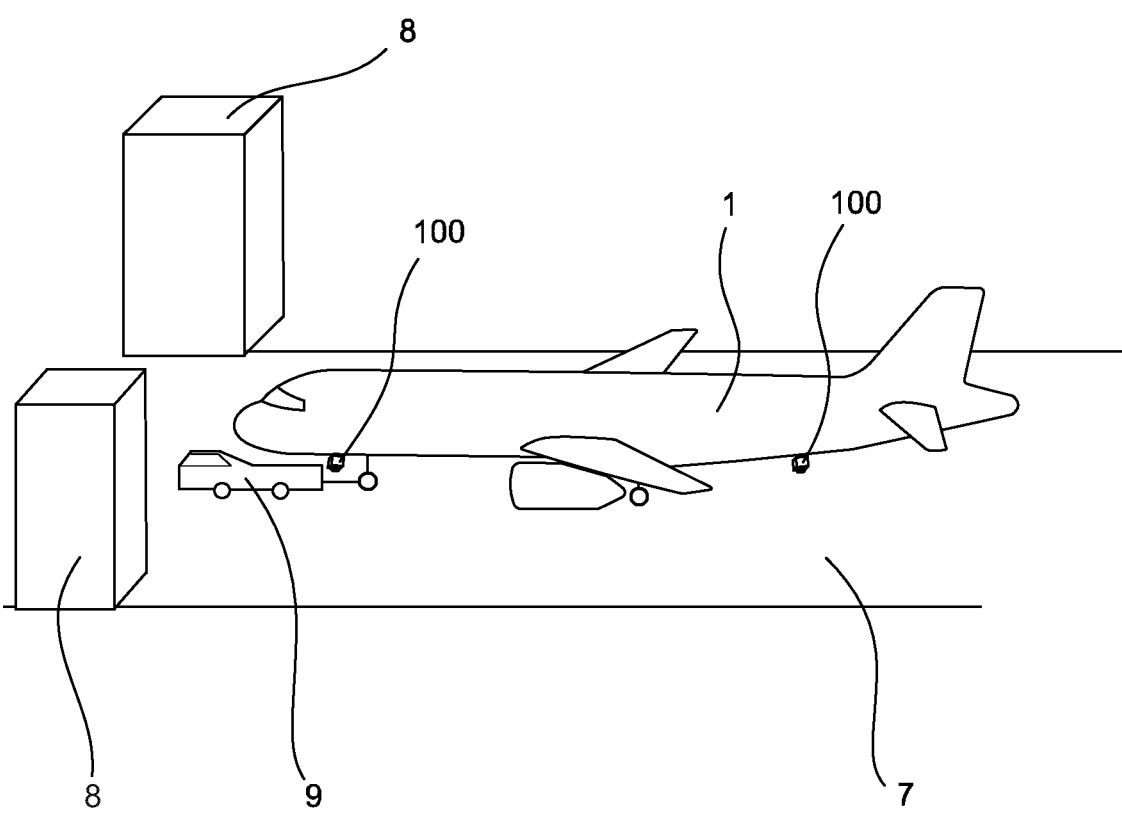
FIG. 5 shows the aircraft from FIG. 4 during rolling over a runway of an airport.

FIG. 5 shows the aircraft 1 from FIG. 4 during towing over a runway 7 of an airport. The aircraft 1 is moved over the runway 7 by a pusher 9. As shown schematically in FIG.

5, towing can take place using a towbar connected to the nose gear of the aircraft 1. Alternatively, a pusher may also lift up the forward nose gear and tow the aircraft 1 thus. As an alternative to the pusher 9, the aircraft 1 may also roll over the runway 7 itself without a pusher. At least one of the portable sensor systems 100 may detect at least one object 8 on the runway 7 or beside the runway 7. In the embodiment shown, the object 8, which is shown only abstractly and schematically in FIG. 5, may be an infrastructure object or a building, for example. The collision monitoring device 34 of the portable sensor systems 100 shown in FIGS. 1 to 3 may monitor the relative attitude of at least one object 8 referenced to the aircraft 1, or the geometric model thereof, and evaluate a relative change of attitude 8. The monitored relative attitude, or change of attitude, may be displayed on the mobile terminal 40 shown in FIGS. 1 to 3. An operator may monitor an impending collision between the aircraft 1 and the object 8.

Figure 6:
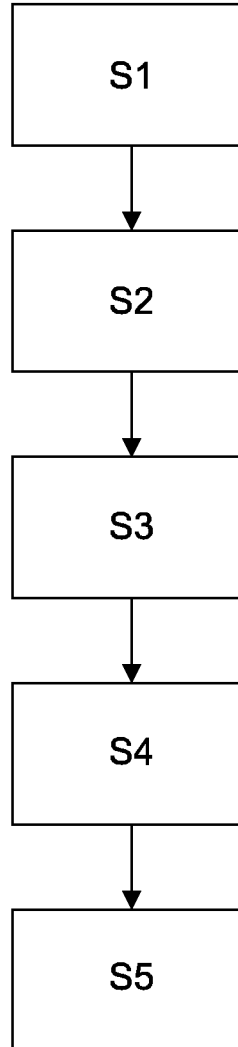
FIG. 6 shows a flowchart for method steps of a method for detecting objects in the surroundings of a mobile object according to an embodiment of the invention.

FIG. 6 shows method steps S1 to S5 in an illustrative chronological sequence. Method steps S1 to S5 are performed in order to detect objects 8 in the surroundings of a mobile object. The mobile object may be the aircraft 1 shown in FIGS. 4 and 5.

In a first step S1, the at least one detection sensor 10 is temporarily mounted on the outer surface of the mobile object. The at least one surroundings detection sensor 10 may be mounted on the outer surface using at least one suction cup 22. The outer surface may be situated on the fuselage region 2 of the aircraft 1.

In a further step S2, region detection is carried out for the outer surface by the surroundings detection sensor 10 mounted on the outer surface. The outer surface may be detected in the detection region 14 spanned by the surroundings detection sensor 10.

In a further step S3, sensor attitude determination for the surroundings detection sensor 10 is carried out. The determination of the sensor attitude 11 is performed relative to the mobile object on the basis of a predetermined geometric model of the outer surface and the region of the outer surface that is detected by the surroundings detection sensor 10. The determination may be performed on a geometric correlation between the model and the region of the outer surface.

In a further step S4, object detection is carried out for objects 8 situated in the surroundings of the mobile object. The objects 8 may be detected by the surroundings detection sensor 10 relative to the mobile object.

In a further step S5, the objects 8 detected in the surroundings of the portable sensor system 100 by the surroundings detection sensor 10 are displayed on the mobile terminal 40. Based on the display, a collision between the mobile object and the detected and displayed object may be monitored in a further step, which is not shown.

LIST OF REFERENCE SIGNS 1 aircraft
2 fuselage region
3 mounting region
4 forward mounting region
5 aft mounting region
6 aircraft coordinate system
7 runway
8 objects
9 pusher
10 surroundings detection sensor
11 sensor attitude
12 3D laser scanner 14 detection region
16 beam angle
20 mounting apparatus
21 handle
22 suction cup
23 suction cup leg
24 housing
26 power supply
30 computing and control device
31 antenna
32 position determination device
34 collision monitoring device
40 mobile terminal
41 terminal antenna
42 display
100 portable sensor system
S1 temporary mounting
S2 region detection
S3 sensor attitude determination
S4 object detection
S5 display

What is claimed is:

1. A portable sensor system for detecting objects in the surroundings of the portable sensor system and for temporary mounting on a mobile object, the portable sensor system comprising:
   a surroundings detection sensor for detecting the objects;
   a mounting apparatus, connected to the surroundings detection sensor for temporarily mounting the portable sensor system on an outer surface of the mobile object; and
   a position determination device for determining a sensor attitude of the surroundings detection sensor when the surroundings detection sensor is in a state in which it is mounted on the outer surface;
   wherein the position determination device is configured to determine the sensor attitude relative to the mobile object on the basis of a predetermined geometric model of the outer surface and a region of the outer surface that is detected by the surroundings detection sensor.

2. The portable sensor system of claim 1, wherein:
   the mobile object is a means for transporting people or goods, in particular an aircraft; and
   the mounting apparatus is designed for temporary mounting of the portable sensor system on an outer surface of the means for transporting people or goods, in particular on a fuselage region of the aircraft.

3. The portable sensor system of claim 1, wherein the surroundings detection sensor comprises a laser scanner, in particular a 3D laser scanner for extensively detecting objects in the surroundings of the portable sensor system.

4. The portable sensor system of claim 1, having a further surroundings detection sensor for detecting the objects, wherein the mounting apparatus is also connected to the further surroundings detection sensor for the purpose of temporarily mounting the portable sensor system on the outer surface of the mobile object.

5. The portable sensor system of claim 1, wherein the mounting apparatus is designed for toolless mounting of the portable sensor system on the outer surface of the mobile object at any position on a mounting region of the outer surface of the mobile object.

6. The portable sensor system of claim 1, wherein the mounting apparatus comprises at least one handle for manual mounting of the portable sensor system on the outer surface of the mobile object.

7. The portable sensor system of claim 1, wherein the mounting apparatus comprises at least one suction cup for suction-force-based mounting of the portable sensor system on the outer surface of the mobile object.

8. The portable sensor system of claim 1, wherein:
   the position determination device is configured to determine the sensor attitude in an object coordinate system that is referenced to the mobile object; and
   the sensor attitude comprises the relative position and the relative orientation of the sensor in relation to the mobile object.

9. The portable sensor system of claim 1, wherein the predetermined geometric model is based on a predefined CAD model of at least one region of the mobile object, and the position determination device is configured to determine the sensor attitude on the basis of a geometric correlation between the detected region of the outer surface and the CAD model of the outer surface.

10. The portable sensor system of claim 1, wherein the position determination device is configured to determine the sensor attitude on the basis of the predetermined geometric model where the predetermined geometric model comprises at least one geometric parameter of the surface.

11. The portable sensor system of claim 1, wherein the position determination device is part of a computing and control device for evaluating measurement data from the surroundings detection sensor and for actuating the surroundings detection sensor.

12. The portable sensor system of claim 1, having a mobile terminal that comprises the position determination device.

13. The portable sensor system of claim 1, having a mobile terminal that is configured to wirelessly communicate with the surroundings detection sensor in order to control the surroundings detection sensor remotely.

14. The portable sensor system of claim 12, wherein the mobile terminal is configured to display objects detected in the surroundings of the portable sensor system by the portable sensor system.

15. The portable sensor system of claim 1, having a collision monitoring device for monitoring objects situated in the surroundings of the portable sensor system, which collision monitoring device is configured to identify whether an object monitored in the surroundings is a potential collision object.

16. The portable sensor system of claim 1, wherein the position determination device comprises a data interface to a logistics information system for the purpose of providing objects detected or monitored by the portable sensor system for the logistics information system.

17. A method for detecting objects in the surroundings of a mobile object, comprising:
   temporarily mounting at least one surroundings detection sensor on an outer surface of the mobile object;
   detecting a region of the outer surface by way of the surroundings detection sensor mounted on the outer surface;
   determining a sensor attitude of the surroundings detection sensor relative to the mobile object on the basis of a predetermined geometric model of the outer surface and the region of the outer surface that is detected by the surroundings detection sensor system; and
   detecting objects in the surroundings of the mobile object by way of the surroundings detection sensor relative to the mobile object.

18. The method of claim 17, comprising the further step of:

displaying, in particular displaying in real time, the objects detected in the surroundings of the portable sensor system by the portable sensor system on a mobile terminal.

19. The method of claim 17, for monitoring the surroundings for potential collision objects that may potentially collide with the mobile object, further comprising:

identifying whether an object detected in the surroundings is a potential collision object, and displaying the potential collision object on a mobile terminal.

20. The method of claim 17:

wherein detecting objects comprises filtering, in particular on the basis of two-dimensional or three-dimensional mapping, of objects in the surroundings of the mobile object that are detected by the surroundings detection sensor.

21. The method of claim 17, wherein:

the mobile object is a means for transporting people or goods, in particular an aircraft;

temporarily mounting comprises temporary mounting of the surroundings detection sensor on an outer surface of the means for transporting people or goods, in particular on a fuselage region of the aircraft; and at least detecting objects is performed during movement of the means for transporting people or goods over the ground, in particular during rolling or reversing of the aircraft on the ground, in particular on a runway of an airport.

22. The portable sensor system of claim 1, wherein the region of the outer surface that is detected by the surroundings detection sensor comprises:

a point cloud containing measurements of the detected region of the outer surface.

23. The portable sensor system of claim 1, wherein the position determination device is further configured to determine the sensor attitude on the basis of an ICP algorithm relating to the detected region of the outer surface and the predetermined geometric model of the outer surface.

*   *   *   *   *